United States Patent [19] [11] 3,884,981
Kiff [45] May 20, 1975

[54] VAPOR PHASE HYDROGENOLYSIS DEHYDROGENATION PROCESS

[75] Inventor: Ben W. Kiff, Ona, W. Va.

[73] Assignee: Union Carbide Corporation, New York, N.Y.

[22] Filed: Dec. 27, 1972

[21] Appl. No.: 318,708

[52] U.S. Cl. ............. 260/595; 260/603 R; 252/468; 252/470; 260/596
[51] Int. Cl. ............................................. C07c 45/18
[58] Field of Search ................. 260/595, 596, 603 R

[56] References Cited
UNITED STATES PATENTS

| | | | |
|---|---|---|---|
| 2,039,543 | 5/1936 | Lorang | 260/596 |
| 2,218,457 | 10/1940 | Winans | 260/596 |
| 2,794,053 | 5/1957 | Altreuter et al. | 260/596 |
| 2,891,095 | 6/1959 | Opity et al. | 260/596 |
| 3,285,713 | 11/1966 | Poehler et al. | 260/596 |

Primary Examiner—Bernard Helfin
Assistant Examiner—James H. Reamer
Attorney, Agent, or Firm—Charles J. Metz

[57] ABSTRACT

A vapor-phase hydrogenolysis-dehydrogenation process in which normally-liquid oxygenated products comprising sec-butanol and sec-butyl acetate are contacted with a solid catalyst comprising the oxides of chromium, of manganese, and of zinc and/or of nickel to produce methyl ethyl ketone.

4 Claims, 1 Drawing Figure

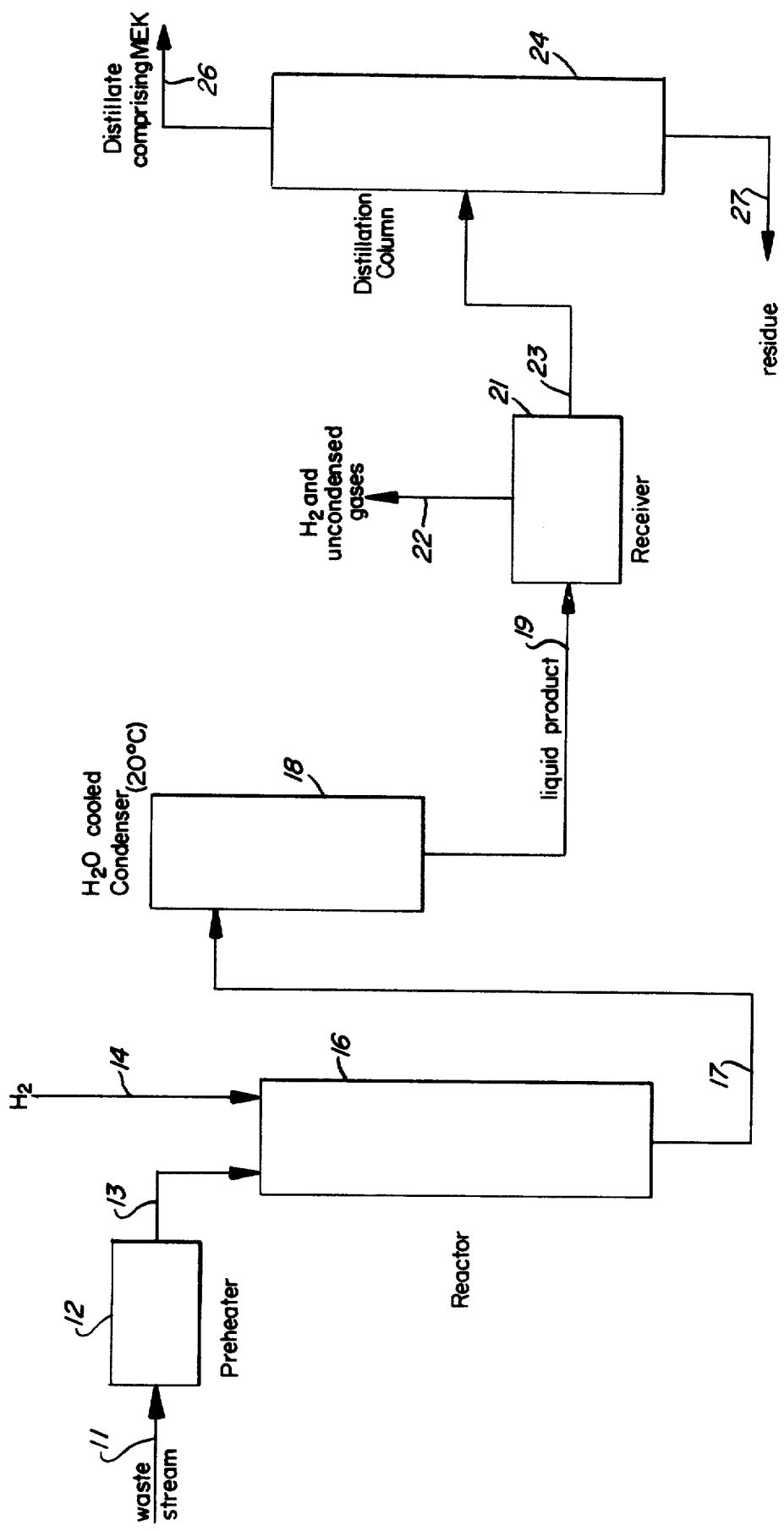

VAPOR PHASE HYDROGENOLYSIS DEHYDROGENATION PROCESS

The present invention is directed to a novel hydrogenolysis-dehydrogenation process in which a vaporous stream of oxygenated products comprising secondary butanol and esters thereof are contacted with a solid catalyst thereby producing substantial quantities of methyl ethyl ketone.

A significant commercial route for preparing acetic acid is via the liquid phase oxidation of n-butane. In addition to the acetic acid product, substantial quantities of methyl ethyl ketone are also produced which can be recovered economically from the oxidation reaction product mixture. Unfortunately, the oxidation process also produces a complex mixture of oxygenated products which is not conveniently and economically separated by conventional methods. This complex mixture of oxygenated products, after recovery of the principal and desired acetic acid and methyl ethyl ketone co-products therefrom, comprises substantial quantities of oxygenated products such as acetone, sec-butanol, ethyl propionate, propyl acetate, sec-butyl acetate, ethyl butyrate, and n-butyl acetate. The combined quantities of sec-butanol and sec-butyl acetate in such complex mixture is quite significant and oftentimes constitutes as much as about one-half, and more, of the total mixture. Unfortunately, the mixture is discarded as a waste stream since resolution of the oxygenated components therein cannot be accomplished on a commercial scale in an economic fashion.

A commercially attractive method of preparing methyl ethyl ketone from the aforesaid waste stream comprising oxygenated by-products would be highly desirable. This would involve converting the sec-butyl acetate fraction to sec-butanol, followed by dehydrogenation of the total sec-butanol content in such stream to methyl ethyl ketone. Saponification of the sec-butyl acetate with an aqueous base represents an obvious approach. This route is not economical because the consumption of the caustic solution, e.g., aqueous NaOH, is quite high in that it reacts with other ester by-products which are present in the waste stream.

The waste stream can also be subjected to hydrogenolysis whereby the sec-butyl acetate portion thereof is converted to sec-butanol, followed by dehydrogenation to produce the desired ketonic compound. The hydrogenolysis step is usually performed as a liquid-phase reaction employing relative expensive catalysts under high hydrogen pressure. The dehydrogenation step is a vapor-phase reaction and, of course, requires a separate operation. The over-all sequence of these two steps is too expensive to produce methyl ethyl ketone profitably on a commercial scale.

There has now been discovered quite unexpectedly, indeed, a novel vapor-phase process whereby a mixture of normally-liquid oxygenated products comprising substantial quantities of sec-butanol and sec-butyl acetate are reacted with hydrogen, at an elevated temperature, in the presence of a novel solid catalyst comprising compounds of chromium and of manganese and additionally, of zinc and/or of nickel, to produce a reaction product mixture comprising carbonylic compounds which are rich in methyl ethyl ketone. The methyl ethyl ketone product can be separated from the reaction product mixture by conventional distillation procedures. During the novel process, hydrogenolysis of sec-butyl acetate yields sec-butanol which, in turn, undergoes dehydrogenation to give methyl ethyl ketone. While the two reactions are consecutive, they take place in a common reaction zone. In this sense they may be considered to be simultaneous. Thus the novel process operated under optimum conditions represents a potentially commercial one-step vapor-phase route in which the conversion of the sec-butanol and the alcohol portion of the sec-butyl acetate present in the feed mixture to methyl ethyl ketone is almost quantitative. From an ecological standpoint the novel process also affords, in the practice of a suitable embodiment, an effective means of converting a waste stream to a useful product.

As catalysts for the novel vapor-phase process, there can be employed the oxides of chromium and of manganese plus the oxide of zinc or of nickel, or mixtures thereof. In the practice of the novel process the highly active form of the catalyst comprises metal oxides predominantly in their lower oxidation state, e.g., manganous oxide and chromium oxide. Oxides containing varying oxidation states of the metal can also be present. The catalyst, as prepared, comprises the metal oxides in an intermediate oxidation state which is, in general, a relatively stable oxidation state, e.g., chromium dioxide, manganese dioxide, etc. Based on chromium as one, the molar ratio of manganese to chromium can range from about 0.3 to about 1.5, preferably from about 0.5 to about 1.0. A catalyst consisting essentially of the oxides of chromium, of manganese, and of zinc is highly preferred as will become apparent from the operative Examples hereinafter. Concentrations appreciably outside the aforesaid ranges result in a catalyst of diminishing activity and/or a hydrogenolysis-dehydrogenation process of decreased efficiency.

In preparing the catalyst, a mixture containing the metals in the desired ratios can be made by dissolving proportionate amounts of water-soluble compounds of the metals, for instance, the nitrates, in a sufficient quantity of water to form a solution. Desirably, pure materials are used, the term "pure" being used in the sense that the compounds are free of injurious or unknown contaminants. The solution containing the metal compounds can then be poured over a support material in a suitable vessel. Practically any material can be used for a support which is inert, chemically and catalytically, and very porous and reasonably strong. The mixture may then be evaporated to dryness in a suitable vessel while being stirred. When the excess water has been evaporated the resulting mixture will assume a pasty consistency. At this stage this mixture can be placed in an oven and roasted. The roasting procedure can be carried out by placing the aforesaid pasty mixture in a muffle furnace heated in a stream of air to a temperature at which the metal nitrates will decompose and holding at that temperature until the evolution of the oxides of nitrogen ceases. A fairly rapid roasting of the material is generally desirable. For this purpose a furnace temperature of, for example, about 350° to about 450°C., is suitable, and at this temperature range a period of a few hours, e.g., about 2–5 hours, is generally sufficient to complete the roasting.

In lieu of pouring the aforesaid aqueous solution of metal nitrates over a support (or dipping and impregnating the support in an aqueous solution of the metal nitrates), an aqueous ammonium hydroxide solution can be added to the aqueous metal nitrates solution whereby metal hydroxides precipitate therefrom. The precipitate can be recovered via filtration, washed, dried, pelleted, and then roasted as described previously to give the oxides of the metals.

In the practice of suitable embodiments of the invention, a vaporous stream of hydrogen and normally-liquid oxygenated hydrocarbons comprising sec-butanol and sec-butyl acetate, especially a stream of relatively low boiling, normally-liquid oxygenated hydrocarbons such as a mixture comprising sec-butanol and carbonylic compounds, e.g., ketones and esters which include significant quantities of sec-butyl acetate therein, are passed over a solid catalyst such as a fixed catalyst bed or fluidized catalyst bed, in a suitable reaction zone. The novel process is applicable to a mixture comprising sec-butanol and sec-butyl acetate in which these two components can vary over an extremely wide range, e.g., from about 5 weight percent, and lower, to about 95 weight percent, and higher, of either component. In the practice of preferred embodiments, the novel process, as indicated previously, is applicable to converting a waste stream which has its origin from the liquid phase oxidation of normal butane to a salable ketonic product. Such waste stream can comprise acetone, sec-butanol, ethyl propionate, propyl acetate, sec-butyl acetate, ethyl butyrate, and n-butyl acetate. This stream can comprise from about 5 to about 30 weight percent sec-butanol and from about 10 to about 50 weight percent sec-butyl acetate. In general, however, a typical waste stream comprises from about 10 to about 20 weight percent of sec-butanol and from about 20 to about 40 weight percent sec-butyl acetate, based on the weight of said stream. The remaining carbonylic compounds are present in minor quantities and can vary, for example, from about one weight percent to about 25 weight percent, and higher. Of course, the over-all composition of waste streams may vary somewhat from different n-butane oxidation runs.

The hydrogenolysis-dehydrogenation reaction is effected at an elevated temperature which is sufficient to maintain the normally-liquid oxygenated hydrocarbon feed in a vaporous form. A suitable temperature range is from about 300° to about 450°C., and preferably from about 350° to about 400°C.

The oxygenated feed, desirably heated to a vaporous state, and hydrogen, are passed over the solid catalyst, using a downstream pressure which approximates atmospheric pressure. The pressure is not critical and pressures lower and higher than atmospheric may be used. By conducting the novel process under optimum conditions, the conversion of sec-butanol and the alcohol portion of sec-butyl acetate to methyl ethyl ketone is nearly quantitative at atmospheric pressure, and consequently, no advantage is realized by using a pressure which represents a material departure from atmospheric pressure. A pressure in the range of from approximately atmospheric to about 10 atmospheres, and higher, is satisfactory. In general, about 1 to 3 atmospheres is desirable.

The novel process is conducted for a period of time sufficient to convert sec-alcohol and sec-butyl acetate to methyl ethyl ketone. In general, this residence period is less than minutes in duration. A suitable residence period is less than about 30 seconds, and from about 1 second to about 15 seconds is a practical range under optimum operating conditions. High productivities, as indicated previously, can be achieved by maintaining the residence period within a commercially practical range, e.g., less than about 10 seconds, and generally less than approximately 5 seconds.

The molar ratios of hydrogen to sec-butyl acetate contained in the oxygenated feed, introduced into the reaction zone, can vary widely, e.g., from less than about 1 mole to about 15 moles, and higher, of hydrogen per mole of contained sec-butyl acetate. A suitable feed is from about 1 to about 5 moles of hydrogen per mole of contained sec-butyl acetate.

The novel process is most conveniently operated in a continuous fashion in an elongated tubular reaction zone which is packed with the solid catalyst. The material of construction should be such that it is inert during the reaction and such material can include, for example, titanium, glass, porcelain, stainless steel, enamel, and the like. The reaction zone may be fitted with internal and/or external heat exchanger(s) to thus control undue temperature fluctuations. Means to introduce and/or adjust the gaseous feed, either intermittently or continuously, into the reaction zone during the course of the reaction can be conveniently utilized in the novel process especially to maintain the desired molar ratios of the reactants. Recovery and resolution of the reaction products, e.g., methyl ethyl ketone, can be achieved by methods well-known in the art such as by distillation, fractionation, and the like.

The novel process can be further illustrated by reference to the drawing which is a schematic flow diagram of a continuous system for carrying out a suitable embodiment of the invention.

Referring now to the drawing, a waste stream of oxygenated products comprising, by weight, approximately 15 percent sec-butanol, 30 percent sec-butyl acetate, 2 percent acetone, 10 percent ethyl propionate, 15 percent propyl acetate, 5 percent ethyl butyrate, 15 percent n-butyl acetate, and small amounts of other normally-liquid oxygenated hydrocarbons is continuously introduced into line 11 and vaporized in preheater 12 which is maintained at about 250°C. at atmospheric pressure. A vaporous stream is withdrawn via line 13 and introduced into tubular reactor 16 which is maintained at about 375°C. and a pressure of about 1 atmosphere and which is packed with catalyst consisting essentially of the oxides of chromium and of manganese and of zinc, the molar ratios of both manganese to chromium (Mn:Cr) and zinc to chromium (Zn:Cr) being 0.6:1 (based on chromium as 1). Hydrogen is introduced into tubular reactor 16 via line 14. The feed rates of hydrogen and the vaporous waste stream are adjusted so as to maintain a molar ratio of hydrogen to sec-butyl acetate (contained in the vaporous waste stream) of about 2:1. The residence period in tubular reactor 16 is approximately 3 seconds. The effluent from tubular reactor 16 comprising methyl ethyl ketone, other products of the reaction, unreacted starting material, and hydrogen is withdrawn via line 17 and is introduced into water-cooled condenser 18 also maintained at atmosphereic pressure. A liquid stream comprising methyl ethyl ketone, other products of the reaction, and other starting material, is withdrawn from condenser 18 via line 19 and introduced into receiver 21 from which hydrogen and uncondensed gases are removed via line 22. A liquid stream is withdrawn from receiver 21 via line 23 and is introduced into the middle section of distillation column 24. Said column 24 is operated at atmospheric pressure with a base temperature of about 100°C. and a head temperature of about 80°C. From column 24 a distillate consisting mainly of methyl ethyl ketone is removed overhead via line 26. Further distillation and/or fractionation gives high purity methyl ethyl ketone. A residue fraction is withdrawn from distillation column 24 via line 27. Depending upon the degree of conversion during the hydrogenolysis-dehydrogenation process, the residue may be discarded or it may be further processed and combined with fresh waste stream to be used as feed to reactor 16 supra.

The term "conversion," as used herein, is conveniently defined by the expression:

$$\frac{\text{Reactant Fed (Moles)} - \text{Reactant Recovered (Moles)}}{\text{Reactant Fed (Moles)}}$$

The term "efficiency", as used herein, is conveniently defined by the expression:

$$\frac{\text{Desired Product (Moles)}}{\text{Reactant Fed (Moles)} - \text{Reactant Recovered (Moles)}}$$

The following Examples are illustrative.

EXAMPLE 1

To 60 grams of chromium trioxide ($CrO_3$) contained in a stainless steel vessel, there was cautiously added 36.5 milliliters of an aqueous solution of 26 weight percent ammonia. A rather violent reaction took place. When it subsided, 300 milliliters of water was added thereto. In a similar manner, a second solution was made by mixing 220 grams of a 50 weight percent solution of manganese nitrate [$Mn(NO_3)_2$] with 200 milliliters of water. A third solution was prepared by dissolving 120 grams of zinc nitrate [$Zn(NO_3)_2$] in 300 milliliters of water.

All three solutions were then combined and while the resulting mixture was being stirred, 90 milliliters of an aqueous solution containing 26 weight percent ammonia was added thereto. The resulting precipitated metal hydroxides were recovered via filtration and washed thoroughly with water. The precipitate was dried at 100°C. overnight and then pelleted. The pellets were roasted in a stream of air at about 400°C. for 4 hours before using the same in the hydrogenolysis-dehydrogenation process discussed hereinafter. The roasted pellets consisted essentially of oxides of chromium, of manganese, and of zinc. Based on chromium as one, the molar ratios of Mn:Cr equaled 0.67 and Zn:Cr equaled 0.67.

EXAMPLE 2

This catalyst was prepared in the same manner as Example 1 with the exception that 110 grams of nickel nitrate [$Ni(NO_3)_2$] was used instead of zinc nitrate. The roasted pellets consisted essentially of oxides of chromium, of manganese, and of nickel. Based on chromium as one, the molar ratios of Mn:Cr equaled 0.67 and Ni:Cr equaled 0.67.

EXAMPLE 3

The reactor employed was a stainless steel tube 48 inches long with a diameter of 1 inch. The tube was enclosed in an electrically-wound jacket containing Dowtherm liquid and the temperature was regulated by heating this liquid. The tube was equipped with inlet lines through which gas and liquid were fed at one end thereof. Temperature in the catalyst bed was measured by means of a thermocouple in a thermowell extending into the tube.

To the reactor there were charged 200 milliliters of the catalyst prepared in Example 1 supra. The reactor was heated to about 375°C. and a small flow of hydrogen was passed through it for 4 hours. After this and with the temperature being maintained at 375°C., there were fed to the reactor hydrogen at the rate of 50 liters per hour, and a waste stream of oxygenated hydrocarbons comprising, by weight, approximately 15 percent sec-butanol, 31 percent sec-butyl acetate, 2 percent acetone, 13 percent ethyl propionate, 17 percent propyl acetate, 3 percent ethyl butyrate, and 13 percent n-butyl acetate, and small amounts of other normally-liquid oxygenated hydrocarbons at a rate of 100 milliliters per hour. A total of 3998 grams of the waste stream was fed over a period of 45 hours. The residence period was approximately 3 seconds.

Vaporous effluent from the reactor was passed through a water-cooled condenser connected to a receiver where most of the normally-liquid products were collected. The gaseous fraction passed through traps cooled to −70°C to condense any remaining liquids. The condensed liquids were collected and distilled at atmospheric pressure. Distillate was collected until the head temperature of the distillation zone reached about 80°C.

The residue from the distillation zone was then re-fed to the tubular reactor using the same conditions as in the first pass. The product was recovered as described above. The distillates from both runs were combined and analyzed by gas chromatography. Based on this analysis, the yield of carbonylic compounds from each 1000 grams of waste stream described above was as follows:

| | |
|---|---|
| Acetone | 55 grams |
| Propionaldehyde | 7 grams |
| Butyraldehyde | 41 grams |
| Methyl ethyl ketone | 327 grams |

EXAMPLE 4

To the tubular reactor described in Example 3, there were charged 200 milliliters of the catalyst prepared in Example 2. The experiment described in Example 3 was repeated using the same operative conditions except that a total of 3,491 grams of the waste stream was charged to the reactor. The combined distillates were analyzed by gas chromatography. The yield of carbonylic compounds from each 1000 grams of waste stream was as follows:

| | |
|---|---|
| Acetone | 51 grams |
| Propionaldehyde | 2 grams |
| Butyraldehyde | 43 grams |
| Methyl ethyl ketone | 185 grams |

EXAMPLE 5

This catalyst was prepared in the same manner as Example 1 with the exception that 100 grams of cupric nitrate [$Cu(NO_3)_2 \cdot 3H_2O$] was used instead of zinc nitrate. The roasted pellets consisted essentially of oxides of chromium, of manganese, and of copper. Based on chromium as one, the molar ratios of Mn:Cr equaled 0.67 and Cu:Cr equaled 0.67.

EXAMPLE 6

To the tubular reactor desribed in Example 3, there were charged 200 milliliters of the catalyst prepared in Example 5. The experiment described in Example 3 was repeated using the same operative conditions except that a total of 3982 grams of the waste stream was charged to the reactor. The combined distillates were analyzed by gas chromatography. The yield of carbonylic compounds from each 1000 grams of waste stream was as follows:

| | |
|---|---|
| Acetone | 19 grams |
| Propionaldehyde | 4 grams |
| Butyraldehyde | 15 grams |
| Methyl Ethyl Ketone | 53 grams |

EXAMPLE 7

This catalyst was prepared in the same manner as Example 1 with the exception that the third component, i.e., [Zn(NO$_3$)$_2$] was omitted. The roasted pellets consisted essentially of oxides of chromium and of manganese. The molar ratio of Mn:Cr equaled 0.67.

EXAMPLE 8

To the tubular reactor described in Example 3, there were charged 200 milliliters of the catalyst prepared in Example 7. The experiment described in Example 3 was repeated using the same operative conditions except that a total of 5364 grams of waste stream was charged to the reactor in a single pass. The distillate was analyzed by gas chromatography. It was determined that 68 weight percent of the sec-butyl acetate component in the waste stream feed was converted to sec-butanol but only a trace of methyl ethyl ketone was formed.

EXAMPLE 9

To the tubular reactor described in Example 3, there were charged 200 milliliters of the catalyst prepared in Example 1. Pure sec-butyl acetate (99.9 weight percent) was fed to the reactor at the rate of 100 milliliters per hour while hydrogen was fed at the rate of 25.6 liters per hour. The temperature of the reactor was maintained at about 385°C. The residence period was about 3 seconds. Analysis by gas-liquid chromatography of the reaction product mixture revealed that the conversion of sec-butyl acetate was 78 percent and the efficiency to methyl ethyl ketone, based on the moles of sec-butyl acetate reacted, was 96 percent.

What is claimed is:

1. A process for the production of methyl ethyl ketone from normally-liquid oxygenated products comprising sec-butanol and sec-butyl acetate which comprises:
   i. reacting a vaporous mixture of said oxygenated products with hydrogen,
   ii. at an elevated temperature in the range of from about 300° to about 450°C.,
   iii. in the presence of a catalyst consisting essentially of (a) an oxide of chromium, (b) an oxide of manganese, and (c) an oxide of at least one metal of the group consisting of zinc and nickel, said metal oxides being predominately in their lower oxidation states, the molar ratios of both manganese to chromium and said metal to chromium being in the range of from about 0.3:1.0 to about 1.5:1.0, and
   iv. from about 1 to about 5 moles of hydrogen per mol of sec-butyl acetate contained in said oxygenated products,
   v. for a period of time sufficient to convert said sec-butanol and said sec-butyl acetate to methyl ethyl ketone, said period being less than about 30 seconds, and
   vi. recovering methyl ethyl ketone from the reaction product mixture;
   wherein said normally-liquid oxygenated products comprise from about 5 to about 30 weight percent sec-butanol and from about 10 to about 50 weight percent sec-butyl acetate.

2. The process of claim 1 wherein said catalyst consists essentially of the oxides of chromium, of manganese, and of zinc.

3. The process of claim 2 wherein said normally-liquid oxygenated products is a waste stream which results from the liquid-phase oxidation of n-butane.

4. The process of claim 3 wherein said catalyst consists essentially of the oxides of chromium, of manganese, and of zinc, in which the molar ratios of both manganese to chromium and zinc to chromium is in the range of from about 0.5:1.0 to about 1.0:1.0.

* * * * *